United States Patent
Kim et al.

(10) Patent No.: US 8,325,665 B2
(45) Date of Patent: Dec. 4, 2012

(54) METHOD FOR SELECTING OPERATIONAL CHANNEL OF NETWORK COORDINATOR IN WIRELESS NARROW AREA NETWORK AND COORDINATOR USING THE SAME

(75) Inventors: Yeon-Soo Kim, Seoul (KR); Hak-Jin Chong, Seoul (KR); Youn-Suk Koh, Seoul (KR); Chae-Eun Hwang, legal representative, Seoul (KR)

(73) Assignee: KT Corporation, Gyeonggi-do (KR)

( * ) Notice: Subject to any disclaimer, the term of this patent is extended or adjusted under 35 U.S.C. 154(b) by 395 days.

(21) Appl. No.: 12/647,910

(22) Filed: Dec. 28, 2009

(65) Prior Publication Data

US 2010/0142396 A1    Jun. 10, 2010

Related U.S. Application Data

(63) Continuation of application No. PCT/KR2008/003818, filed on Jun. 30, 2008.

(30) Foreign Application Priority Data

Jun. 28, 2007  (KR) .................. 10-2007-0064508

(51) Int. Cl.
*H04W 4/00* (2009.01)

(52) U.S. Cl. ........ 370/329; 370/336; 370/338; 370/350; 455/509

(58) Field of Classification Search .............. 375/260, 375/316, 359, 140, 354, 219, 377, 35; 455/423, 455/509, 512, 450, 452.2, 456.1, 343; 370/238, 370/350, 312, 329, 328, 336, 345, 349, 338, 370/248, 250, 389, 252, 432, 335, 471, 474, 370/341, 468, 447, 473, 436, 400, 401, 230, 370/229, 278, 444, 347, 392, 503
See application file for complete search history.

(56) References Cited

U.S. PATENT DOCUMENTS

2003/0152059 A1*  8/2003  Odman .................. 370/338
(Continued)

FOREIGN PATENT DOCUMENTS

KR    1020050040446 A    5/2005
(Continued)

OTHER PUBLICATIONS

Anis Koubaa et al., "Collision-Free Beacon Scheduling Mechanisms for IEEE 802.15.4/Zigbee Cluster-Tree Wireless Sensor Networks," in Proc. of the 7th ASWN 2007.
Notice of Preliminary Rejection issued from Korean Intellectual Property Office on Aug. 30, 2010.

*Primary Examiner* — Abdullah Riyami
(74) *Attorney, Agent, or Firm* — IP Legal Services, LLC

(57) ABSTRACT

A method for selecting an operational channel of a wireless narrow area network, a coordinator using the same, and a computer-readable recording media recording a program for realizing the method. More particularly, a method for selecting an operational channel of a wireless narrow area network in which one radio channel is occupied by a plurality of coordinators at different timings by selecting a predetermined period of a radio channel where a coordinator of the wireless narrow area network is used by another coordinator as own operational channel, a coordinator using the same, and a computer-readable recording media recording a program for realizing the method.

23 Claims, 10 Drawing Sheets

U.S. PATENT DOCUMENTS

| | | | |
|---|---|---|---|
| 2003/0174690 A1* | 9/2003 | Benveniste | 370/350 |
| 2005/0013267 A1 | 1/2005 | An | |
| 2005/0094657 A1 | 5/2005 | Sung et al. | |
| 2005/0169292 A1* | 8/2005 | Young | 370/432 |
| 2006/0007907 A1 | 1/2006 | Shao et al. | |
| 2006/0029061 A1* | 2/2006 | Pister et al. | 370/389 |
| 2006/0068820 A1* | 3/2006 | Sugaya et al. | 455/512 |
| 2006/0072694 A1* | 4/2006 | Dai et al. | 375/354 |
| 2006/0245440 A1* | 11/2006 | Mizukoshi | 370/400 |
| 2007/0002803 A1* | 1/2007 | Destino et al. | 370/335 |
| 2007/0036085 A1* | 2/2007 | Runkle et al. | 370/248 |

FOREIGN PATENT DOCUMENTS

| | | |
|---|---|---|
| KR | 1020050074814 A | 7/2005 |
| KR | 1020060018842 A | 3/2006 |
| KR | 1020070029927 A | 3/2007 |

* cited by examiner

METHOD FOR SELECTING OPERATIONAL CHANNEL OF NETWORK COORDINATOR IN WIRELESS NARROW AREA NETWORK AND COORDINATOR USING THE SAME

PRIORITY

This application is a continuation of PCT/KR2008/003818 filed on Jun. 30, 2008, which claims priority of Korean patent application number 10-2007-0064508 filed on Jun. 28, 2007. The disclosure of each of the foregoing applications is incorporated herein by reference in its entirety.

BACKGROUND

The present invention relates to a method for selecting an operational channel of a wireless narrow area network, a coordinator using the same, and a computer-readable recording media recording a program for realizing the method; and, more particularly, to a method for selecting an operational channel of a wireless narrow area network in which one radio channel is occupied by a plurality of coordinators at different timings by selecting a predetermined period of a radio channel where a coordinator of the wireless narrow area network is used by another coordinator as own operational channel, a coordinator using the same, and a computer-readable recording media recording a program for realizing the method.

Generally, a wireless narrow area network includes a wireless personal network, e.g., a body sensor network, a wireless sensor network, and a wireless home network. The wireless narrow area network commonly designates a wireless network whose wireless communication range is smaller than Wireless Local Area Network (WLAN).

The wireless narrow area network is widely applied to diverse instruments control by a low power wireless device and information sensing on situation and objects in a limited space such as a home, a human body and an independent observation area.

Since the wireless narrow area network can be applied to diverse application fields from now on, the wireless narrow area network is considered as core technology for supporting a future ubiquitous environment.

The wireless narrow area network basically includes one coordinator and more than one node.

There are 'a terminal node', which is a data generator, and 'a router node', which functions as a repeater for data transmission, as kinds of the nodes.

The coordinator is a center of the wireless narrow area network and has 'network information required for forming the wireless narrow area network' to be loaded in a beacon frame and transmitted.

The coordinator has a duty cycle operating in an active state or an inactive state in turn, i.e., a superframe including an active period and a sleep period, and an operational channel as a unique attribute. At this time, the coordinator broadcasts a beacon frame on the wireless narrow area network during the active period. In addition, the coordinator determines network identification (ID) information for identifying the wireless narrow area network node.

The network information includes network ID information determined by the coordinator, a radio channel ID number, a beacon interval (BI) and superframe duration (SD).

When the coordinator is installed at a predetermined point, the coordinator determines a radio channel to be used in own wireless narrow area network. The radio channel determined by the coordinator is different from a neighboring radio channel used in a neighboring wireless narrow area network and should be a channel where interference with the neighboring radio channel does not occur. In addition, the radio channel determined by the coordinator should provide good wireless communication between the wireless narrow area network nodes.

In particular, in case of an industrial scientific and medical (ISM) frequency band, interference between channels should be sufficiently considered since diverse wireless systems use the same channel band.

To be specific, the coordinator sequentially checks a state of each radio channel of usable channel bands in order to determine own radio channel to be used. That is, when the coordinator checks the state of the radio channel, the coordinator determines based on Received Signal Strength (RSS) whether the radio channel is occupied by the neighboring wireless narrow area network. The coordinator compares the RSS measured in a predetermined radio channel with a predetermined threshold and determines whether to use the radio channel or not.

When the RSS of the radio channel is larger than the threshold, the coordinator determines that the radio channel is occupied by another coordinator and selects another radio channel in a predetermined order or randomly.

The radio channel may be determined as a state that the radio channel is occupied by another coordinator due to interference by a signal having the same frame format or a signal having a different frame format.

When the RSS of the radio channel is lower than the threshold, the coordinator determines that the radio channel is not used by the neighboring wireless narrow area network. In this case, the coordinator may select the radio channel as a usable channel.

As described above, the coordinator checks the channel state of each radio channel of the given channel band and selects one radio channel of the checked radio channels as a private radio channel, i.e., an operational channel. That is, the coordinator exclusively selects one radio channel, which is not occupied by the coordinator of the neighboring wireless narrow area network, among the given radio channels, and determines a private radio channel.

FIG. 1 shows an operational channel selecting state in a plurality of conventional wireless narrow area networks.

As shown in FIG. 1, the radio channel selecting state in the conventional wireless narrow area networks shows a state that independent radio channels $f_1$, $f_2$, $f_3$, and $f_4$ are selected by 4 coordinators, e.g., coordinators of SAN1, SAN2 SAN3 and SAN4, existing one by one within 4 wireless narrow area networks, e.g., SAN1, SAN2 SAN3 and SAN4.

The 4 coordinators of SAN1, SAN2 SAN3 and SAN4 occupy independent radio channels such as the radio channel $f_1$, the radio channel $f_2$, the radio channel $f_3$, and the radio channel $f_4$. That is, the coordinator of SAN1 selects the radio channel $f_1$ at a beacon interval of "32" and a superframe duration of "4". The coordinator of SAN2 selects the radio channel $f_2$ at a beacon interval of "64" and a superframe duration of "2". The coordinator of SAN3 selects the radio channel $f_3$ at a beacon interval of "16" and a superframe duration of "4". The coordinator of SAN4 selects the radio channel $f_4$ at a beacon interval of "64" and a superframe duration of "4".

The conventional radio channel selection method does not have any problem when non-occupied radio channels are sufficient.

However, in the conventional radio channel selection method, the number of radio channels usable by the coordinator is limited in cases that there are a plurality of wireless narrow area networks in the same channel band, that there is a wireless network of another method such as WLAN and Ultra-WideBand (UWB) except the wireless narrow area network at the same time, and that there is a wireless network of a 2.4 GHz band where a plurality of industrial scientific and medical instruments are operated.

In particular, when the wireless narrow area network is newly installed at the area, it is difficult to provide an exclusively operated radio channel to a plurality of coordinators according to the conventional radio channel selection method.

As described above, when there are coordinators of the low duty cycle remarkably exceeding the allocation number of radio channels in a state that the number of usable radio channels is limited such as the industrial scientific and medical band, the conventional radio channel selection method has a problem in efficiently operating the radio channel of the wireless narrow area network.

Meanwhile, there is a method for scheduling a radio channel reservation and selection state of each coordinator collectively in a central master controller as another conventional method.

However, the conventional radio channel reservation and selection method cannot be applied when a plurality of wireless narrow area networks are respectively applied and operates at the same time for different services by the same or different providers in the same spatial location, i.e., when a plurality of coordinators existing in the area are controlled by different master controllers.

In order to solve the problem of the conventional technology, an efficient radio channel operation method for sufficiently providing radio channels usable by the coordinator of low duty cycle is essentially required.

SUMMARY OF THE INVENTION

An object of the present invention is to solve the problem of the conventional technology and correspond to the requirement.

Therefore, an embodiment of the present invention is directed to providing a method for selecting an operational channel of a wireless narrow area network in which one radio channel is occupied by a plurality of coordinators at different timings by selecting a predetermined period of a radio channel where a coordinator of the wireless narrow area network is used by another coordinator as own operational channel, a coordinator using the same, and a computer-readable recording media recording a program for realizing the method.

The objects of the present invention are not limited to the above-mentioned ones. Other objects and advantages of the present invention can be understood by the following description, and become apparent with reference to the embodiments of the present invention. Also, it is obvious to those skilled in the aft of the present invention that the objects and advantages of the present invention can be realized by the means as claimed and combinations thereof.

In accordance with an aspect of the present invention, there is provided a method for selecting an operational channel of a wireless narrow area network, including: checking a channel occupied state of another coordinator operated in an effective channel based on a beacon frame in a coordinator of the wireless narrow area network; detecting an operable period based on a check result of the channel occupied state in the coordinator; and determining a time offset according to the operable period detection result in the coordinator.

In accordance with another aspect of the present invention, there is provided a coordinator of a wireless narrow area network, including: a channel state checking means for checking a channel occupied state of another coordinator operated in an effective channel based on a beacon frame; an operable period detecting means for detecting an operable period based on a check result of the channel occupied state in the channel state checking means; and determining a time offset according to a detection result in the operable period detecting means.

In accordance with another aspect of the present invention, there is provided a computer-readable recording media recording a program for realizing following functions in a coordinator having a processor, the functions including: checking a channel occupied state of another coordinator operated in an effective channel based on a beacon frame; detecting an operable period based on the check result of the channel occupied state; and determining a time offset according to the operable period detection result.

The present invention can improve frequency efficiency and operation efficiency of a radio channel since a plurality of coordinators occupy one radio channel at different timings in a wireless narrow area network.

That is, even when the number of radio channels is limited in comparison with the number of wireless narrow area networks s or when the radio channels of the wireless narrow area networks are completely occupied, the present invention can acquire high frequency efficiency and channel usage efficiency by using a non-occupied block period of an effective channel.

In addition, the present invention can provide superframe start timing and its time offset for a coordinator newly entering the wireless narrow area network.

The present invention can provide extensibility for building a plurality of wireless narrow area networks in a limited area.

DETAILED DESCRIPTION OF EMBODIMENTS

The advantages, features and aspects of the invention will become apparent from the following description of the embodiments with reference to the accompanying drawings, which is set forth hereinafter, Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 2:
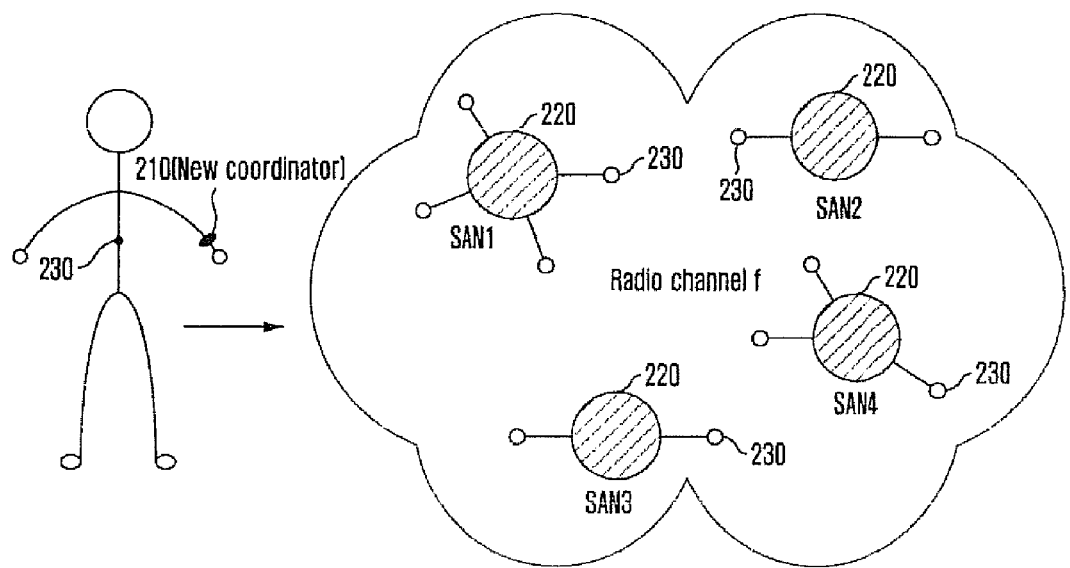
FIG. 2 shows a plurality of wireless narrow area networks where the present invention is applied.

FIG. 2 shows a plurality of wireless narrow area networks where the present invention is applied.

As shown in FIG. 2, the wireless narrow area networks where the present invention is applied include a new coordinator 210 forming a new wireless narrow area network by moving its location from another area to a predetermined area, or being located in a predetermined area, and more than one typical coordinator, which is called as a typical coordinator 220 hereinafter, forming each wireless narrow area network by occupying one radio channel at different timings.

For the sake of easy explanation, the typical coordinator 220 is used as a common word designating 4 coordinators and 4 wireless narrow area networks where each coordinator is located designate SAN1, SAN2, SAN3, and SAN4. At this time, the typical coordinator 220 located in the 4 wireless narrow area networks of SAN1, SAN2, SAN3, and SAN4 forms each wireless narrow area network by occupying one radio channel f at different timings.

The new coordinator 210 and the typical coordinator 220 periodically broadcast a beacon frame to perform data communication with a node 230 included in the wireless narrow area network. The new coordinator 210 and the typical coordinator 220 use a superframe dividing consecutive two beacon frames into an active period and a sleep period such that constituent elements of the wireless narrow area network, i.e., the coordinator and the node, periodically repeat a wakeup operation of performing data communication through a radio channel during the active period and a sleep operation of stopping data communication during a sleep period.

Meanwhile, the node 230 synchronizes timings on the active period and the sleep period of the wireless narrow area network based on the beacon frame. Also, the node 230 checks 'general information of a network including time offset' determined by the coordinator through the beacon frame.

To be specific, the superframe is divided into 'beacon interval', which is a time interval of the beacon frame, and 'superframe duration', which is a duration time of the active period. The superframe duration is divided into a plurality of slots having a predetermined length and one slot includes a predetermined number of data symbols.

In particular, the superframe duration includes 'a guard symbol' for preventing interactive interference occurring between neighboring nodes at the end of the active period. Therefore, the active period is determined as a period excluding 'the guard symbol' from the superframe duration. To be specific, 'the guard symbol' is a null symbol, which does not have any symbol value, i.e., any energy, and the time period is determined according to the format of the wireless narrow area network. For example, 1 or 2 guard symbols are applied in the wireless narrow area network of the star type and 3 to 5 guard symbols are applied in a multi-hop wireless network.

For reference, the wireless narrow area network where the present invention is applied includes topologies of diverse formats such as a star type, a tree type, a cluster type and a mesh type according to a connection type of the nodes and the topologies are selected properly according to flexibility and extensibility of the network, an application model and a built area characteristic.

Meanwhile, the new coordinator 210 should select 'a radio channel to be used in the new wireless narrow area network, i.e., an operational channel, to form a new wireless narrow area network by moving from another area to a predetermined area or by being located in a predetermined area.

Accordingly, the new coordinator 210 of the present invention selects a predetermined period in the sleep period of the radio channel used by the typical coordinator 220 as own operational channel. That is, the new coordinator 210 occupies 'one radio channel used by the typical coordinator 220, i.e., the radio channel f of FIG. 2' with the typical coordinator 220 at different timings.

In other words, it means that a time offset corresponding to a superframe start timing should be determined in order to determine a superframe duration that the nodes of the new coordinator 210 wakes up in the inactive state and maintains the active state. A configuration of the new coordinator 210 will be described as follows with reference to FIG. 3.

Figure 3:
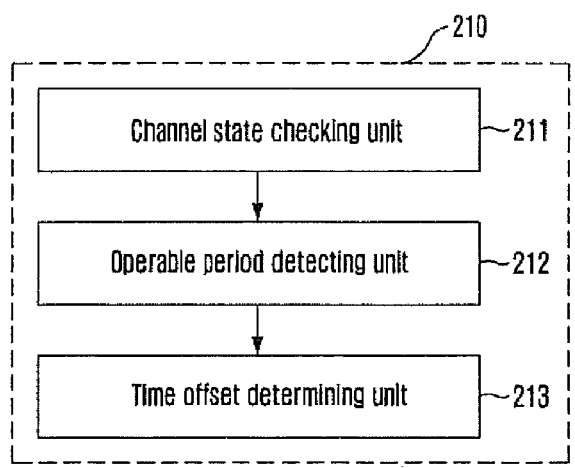
FIG. 3 is a block diagram showing a coordinator in accordance with an embodiment of the present invention.

FIG. 3 is a block diagram showing the coordinator in accordance with an embodiment of the present invention.

As shown in FIG. 3, the coordinator in accordance with the present invention includes a channel state checking unit 211, an operable period detecting unit 212 and a time offset determining unit 213. The channel state checking unit 211 checks a channel occupied state of a typical coordinator operated in each effective channel based on the beacon frame. The operable period detecting unit 212 detects based on a check result of the channel occupied state in the channel state checking unit 211 whether there is a non-occupied slot period, i.e., an operable period. The time offset determining unit 213 determines a time offset, i.e., a start timing for a proper slot period, according to a detection result in the operable period detecting unit 212.

The channel state checking unit 211 determines a reference slot timing for determining a time offset of the typical coordinator sharing the effective channel based on the beacon frame received through the effective radio channel among the operational channels.

The operable period detecting unit 212 detects a non-occupied block period between the superframes and an operable period according to the non-occupied block period by arranging the superframes in a time order based on the reference slot timing determined in the channel state checking unit 211.

The time offset determining unit 213 checks a slot block for own superframe duration in the operable period detected in the operable period detecting unit 212 and determines a time offset, i.e., own superframe start timing.

An operation and a detailed embodiment of the coordinator in accordance with the present invention will be described.

Figure 8:
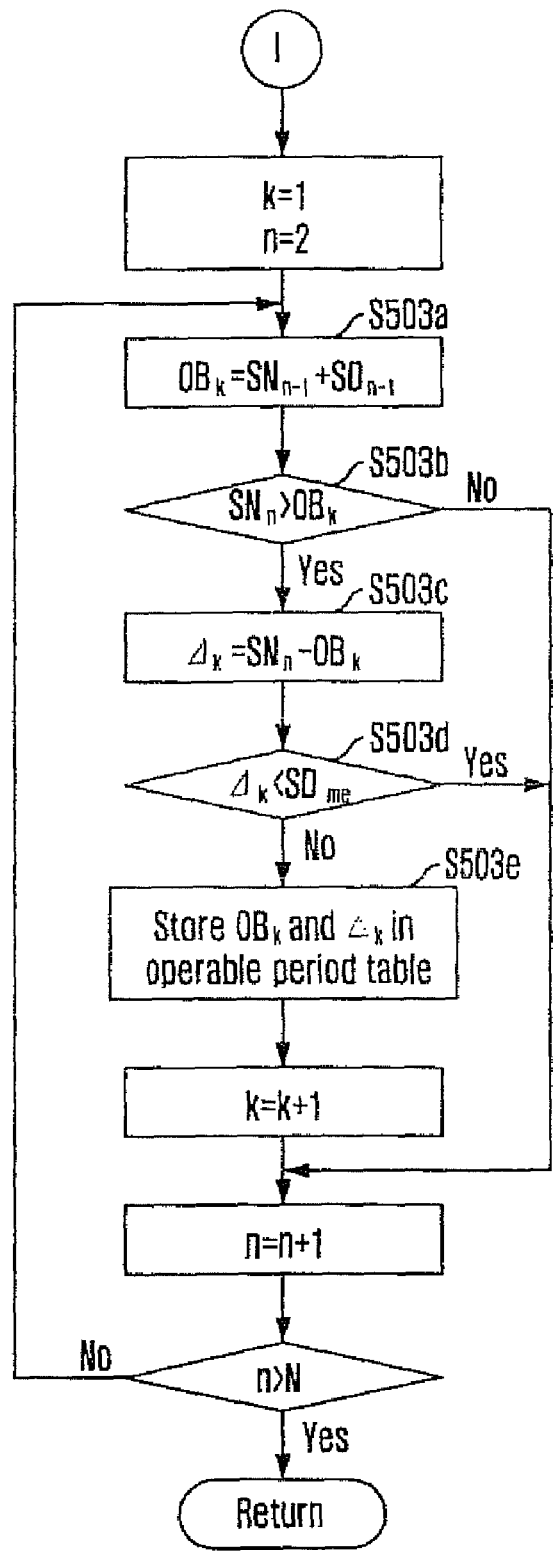
Figure 9:
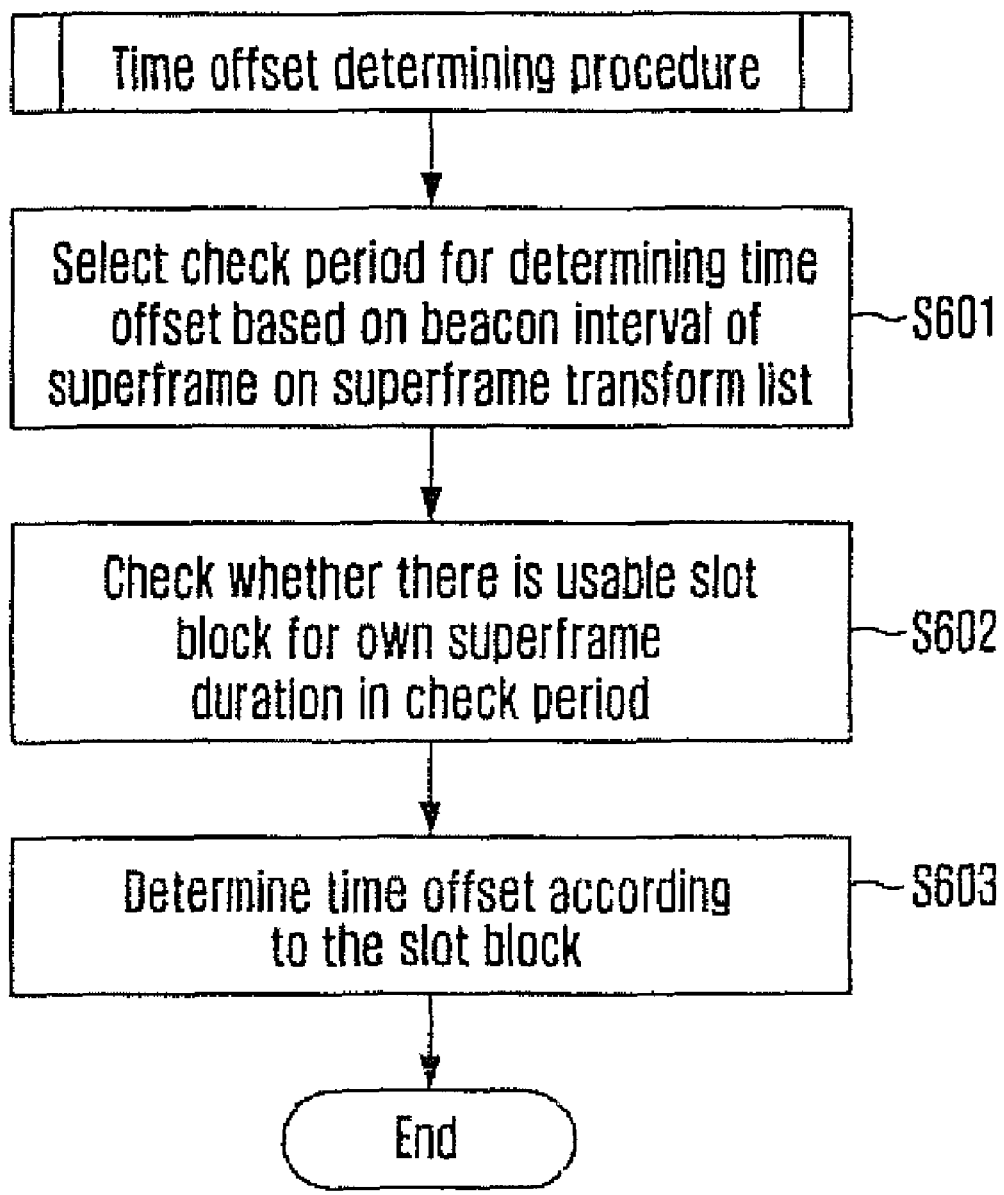
FIG. 9 is a flowchart illustrating a time offset determining procedure in accordance with an embodiment of the present invention.
Figure 10:
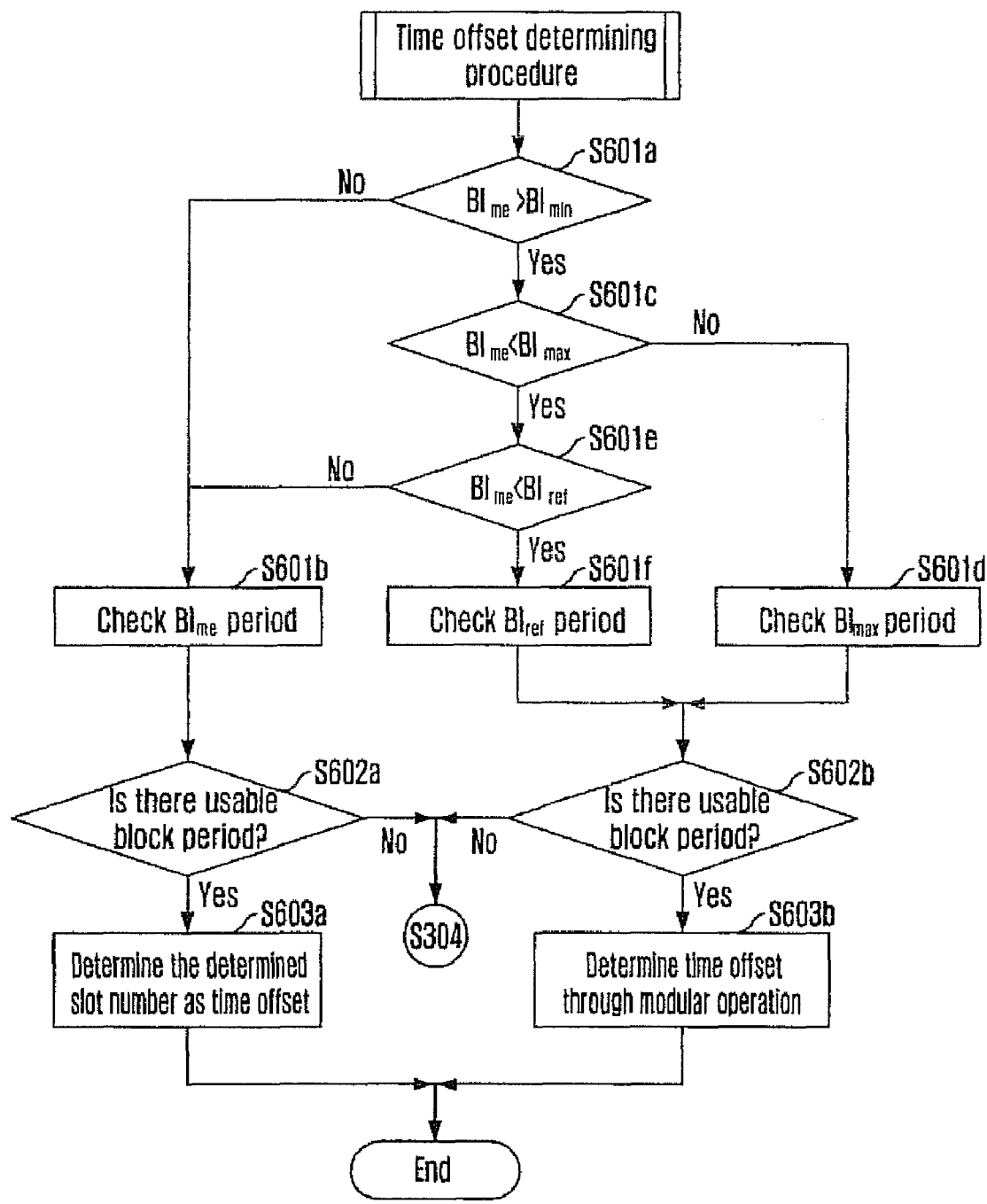
FIG. 10 shows an example of FIG. 9.

The new coordinator 210 performs a channel state checking procedure (see FIG. 5), an operable period detecting procedure (see FIGS. 6 to 8) and a time offset determining procedure (see FIGS. 9 and 10). In the channel state checking procedure, a channel occupied state of the typical coordinator 220 is checked based on the beacon frame transmitted from the typical coordinator 220 through 'an effective radio channel among operational channels for a predetermined radio channel, i.e., an effective channel'. In the operable period detecting procedure, the new coordinator 210 checks whether there is a non-occupied block period, which is usable as own operational channel, in the effective channel, and detects 'an operable period'. In the time offset determining procedure, the new coordinator 210 determines a time offset, which is own superframe start timing, in the operable period as a detection result.

As described above, the new coordinator 210 should select the effective channel in the predetermined radio channel before performing the operational channel selecting procedures, i.e., "the channel state checking procedure", "the operable period detecting procedure", and "the time offset determining procedure". It will be described in detail with reference to FIG. 4.

Figure 4:
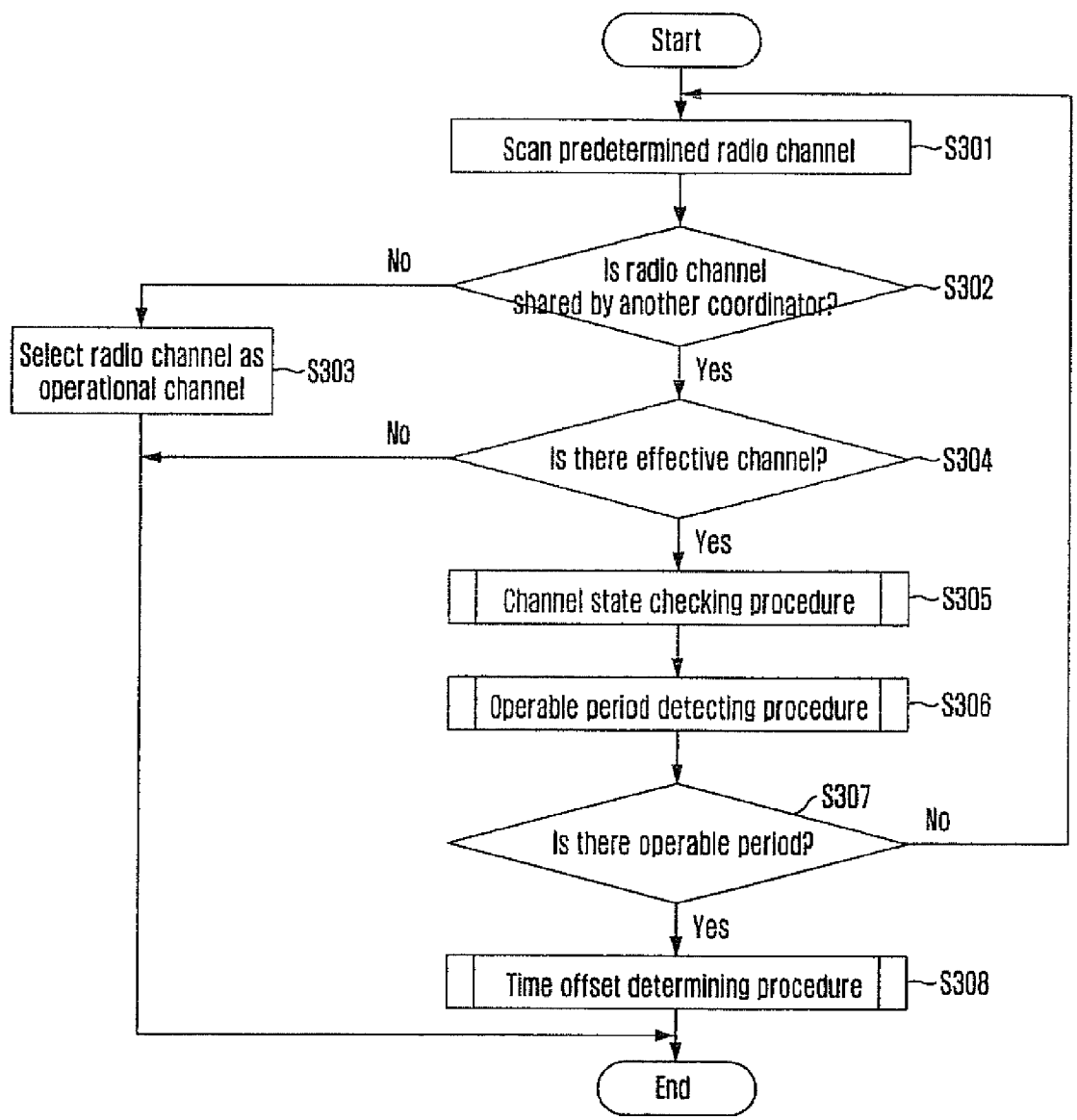
FIG. 4 is a flowchart describing an operational channel selection method in accordance with an embodiment of the present invention.

FIG. 4 is a flowchart describing an operational channel selection method in accordance with an embodiment of the present invention.

The new coordinator 210 scans a predetermined radio channel at step S301. At this time, the new coordinator 210 sequentially or randomly scans the radio channel according to a channel number.

The radio channel scanned by the new coordinator 210 is in a state that another coordinator, i.e., the typical coordinator 220, does not occupy, a state that there is no interference with another coordinator, or a state that another coordinator, i.e., the typical coordinator 220, already occupies.

Accordingly, the new coordinator 210 checks at step S302 whether the scanned radio channel is occupied by another coordinator, i.e., the typical coordinator 220.

At the check result of the step S302, when it is turned out that the scanned radio channel is not occupied by the typical coordinator 220, the new coordinator 210 selects the non-occupied radio channel as an operational channel at step S303. That is, when there is the non-occupied radio channel, which is not occupied by the typical coordinator 220, the new coordinator 210 selects a predetermined timing as a start timing of own superframe duration in the non-occupied radio channel. At this time, the new coordinator 210 sets up the time offset as "0".

Accordingly, the new coordinator 210 becomes a $1^{st}$ coordinator occupying the radio channel. Also, the start timing of the superframe duration of the new coordinator 210 becomes a time offset reference of another coordinator to occupy the radio channel at different timings.

Meanwhile, at the check result of the step S302, when it is determined that scanned all radio channels are occupied by the typical coordinator 220, the new coordinator 210 checks at step S304 whether there is an effective channel usable as own operational channel. It is for identifying whether the new coordinator 210 is a homogeneous coordinator using the same format in order to occupy the radio channel occupied by the typical coordinator 220 at different timings. The new coordinator 210 checks whether the data symbol of the radio channel or the frame format is identifiable, and checks which channel among predetermined radio channels corresponds to an effective channel.

At the check result of the step S304, when there is no effective channel, the logic flow goes to the end. When there is the effective channel, the new coordinator 210 performs a procedure of selecting an operational channel for the effective channel. That is, the new coordinator 210 selects the operational channel by performing the operational channel selecting procedure for the effective channel, i.e., the channel state checking procedure of the step S305, the operable period detecting procedure of the step S306, the time offset determining procedure of the step S308. In particular, it is checked at step S307 whether there is an operable period in the operable period detecting procedure of the step S306.

The new coordinator 210 can perform the operational channel selecting procedure sequentially for the effective channels occupied by another coordinator, i.e., the typical coordinator 220, to determine own time offset. The new coordinator 210 sequentially performs the operational channel selecting procedure until own time offset for each effective channel is determined after checking the effective channels, or performs the operational channel selecting procedure whenever one effective channel is checked.

A case that the new coordinator 210 sequentially performs the operational channel selecting procedure until own time offset for each effective channel is determined after checking the effective channels will be described.

The new coordinator 210 selects a radio channel having the largest Received Signal Strength (RSS) among the effective channels and performs the operational channel selecting procedure for selecting a start timing of own superframe duration, i.e., a time offset. At this time, when there is a period, which can be operated in the effective channel, i.e., an operable period, the new coordinator 210 determines own time offset. When there is no operable period in the effective channel and the time offset cannot be selected, the new coordinator 210 selects a radio channel having the second largest RSS among the effective channels and repeats the operational channel selecting procedure.

As another example, a case that the new coordinator 210 performs the operational channel selecting procedure whenever one effective channel is checked will be described.

When one effective channel is checked, the new coordinator 210 performs the operational channel selecting procedure for selecting a start timing of own superframe duration for the effective channel. When there is the operable period, the new coordinator 210 determines own time offset. When there is no operable period and the time offset cannot be selected, another effective channel is detected. Subsequently, the new coordinator 210 performs the operational channel selecting procedure when another effective channel is checked.

FIG. 4 shows a case that the operational channel selecting procedure is performed whenever one effective channel is checked.

The operational channel selecting procedure, i.e., "the channel state checking procedure", "the operable period detecting procedure", and "the time offset determining procedure", will be described in detail with reference to FIGS. 5 to 10.

Figure 5:
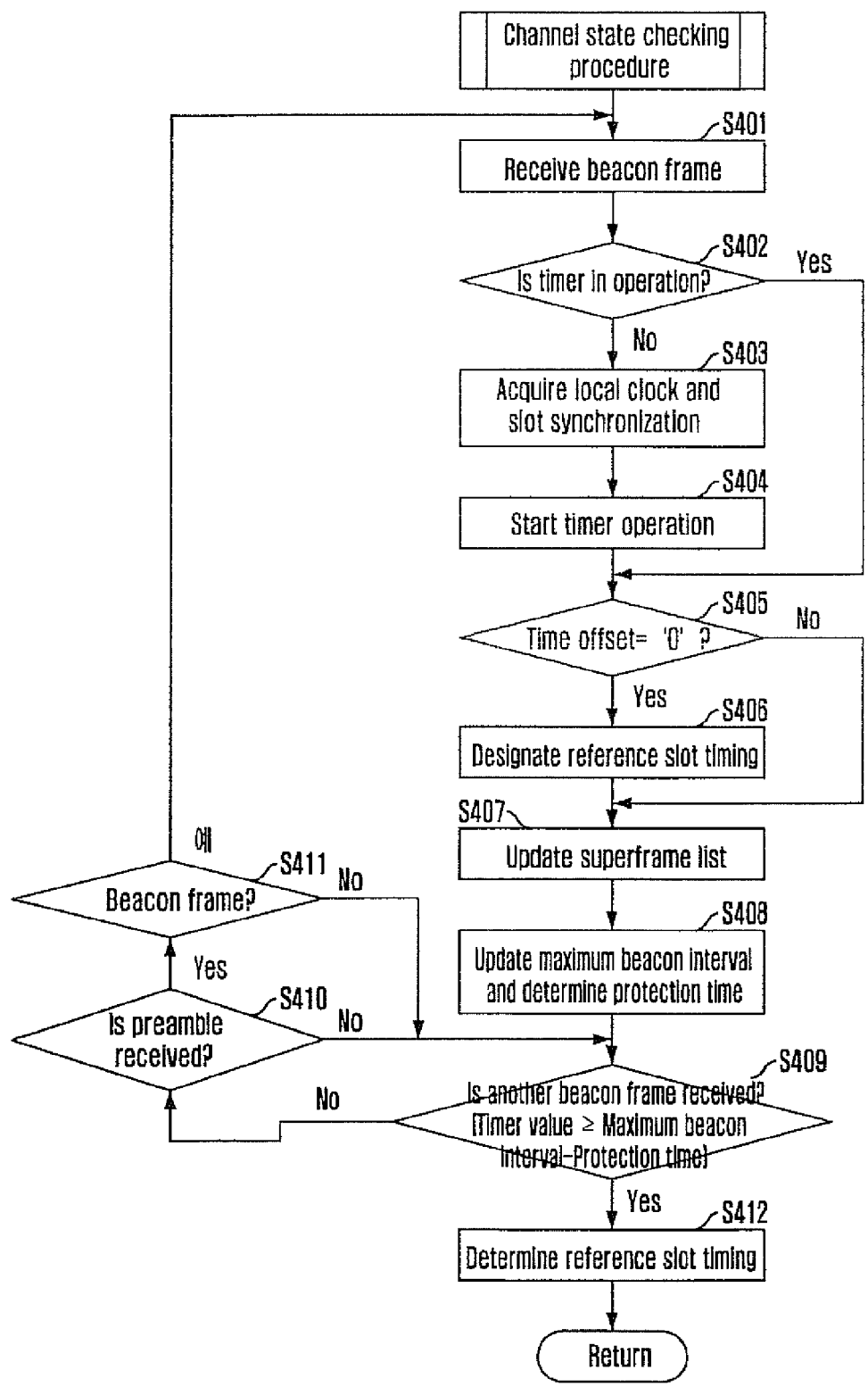
FIG. 5 is a flowchart illustrating a channel state checking procedure in accordance with an embodiment of the present invention.

FIG. 5 is a flowchart illustrating the channel state checking procedure in accordance with an embodiment of the present invention.

As shown in FIG. 5, the channel state checking procedure in accordance with the present invention is a procedure of checking a channel occupied state of the typical coordinator 220 based on a beacon frame that the new coordinator 210 receives through one effective channel.

The new coordinator 210 acquires local clock and slot synchronization for itself through the beacon frame received through the effective channel. The new coordinator 210 updates superframe information of each typical coordinator 220 and a list for its time offset, i.e., "a superframe list".

The new coordinator 210 determines its own usable 'reference slot timing', i.e., a start timing of superframe duration of the $1^{st}$ coordinator, on the superframe list. The reference slot timing becomes a reference timing for determining a time offset of the coordinators sharing the effective channel in order to figure out which timing is the reference timing for determining the time offset of the new coordinator 210.

To be specific, in FIG. 5, the new coordinator 210 receives a beacon frame through the effective channel at step S401 and checks at step S402 whether a timer for limiting a period of the channel state checking procedure is in operation.

At the check result of the step S402, when the timer is in operation, a logic flow goes to the step S405. When an initial beacon frame is received in a sleep state of the timer, the new coordinator 210 acquires local clock and slot synchronization from the beacon frame transmitted through the effective channel at step S403. The new coordinator 210 performs the channel state checking procedure at step S404 by operating the timer within 'the maximum beacon interval'. The maximum beacon interval means a state that an effective period of the timer is not determined when the new coordinator 210 initially operates the timer.

The new coordinator 210 checks the time offset of the beacon frame at step S405. The new coordinator 210 checks first whether the time offset is '0' since a superframe having the time offset of '0' is a candidate of the reference slot timing. At the check result of the step S405, when the time offset is not '0', the logic flow goes to a step S407. When the time offset is '0', the new coordinator 210 designates a slot counter value of the timing as the candidate of the reference slot timing at step S406. The slot counter starts simultaneously with the slot synchronization.

The new coordinator 210 updates the superframe list at step S407. That is, the new coordinator 210 adds the superframe list, which does not have any information before receiving the beacon frame, line by line whenever the beacon frame is received.

For example, when the new coordinator 210 receives N beacon frames, each superframe is added in the superframe list as $SF=[SF_1, SF_2, \ldots, SF_N]^T$. Each element $SF_N$ of the superframe list includes a beacon interval (BI), a superframe duration (SD), a time offset (TO), a reference slot (SR), and a slot number (SN). That is, each element of the superframe list is as $SF_n=[BI_n,SD_n,TO_n,SR_n,SN_n]^T$ and a subscript n relates to an $n^{th}$ reception beacon frame. In particular, the reference slot displays that the start timing of the superframe duration is a $0^{th}$ slot. The slot number is shown after extensively transforming the time offset into a slot index on the maximum beacon interval $BI_{max}$.

The new coordinator 210 updates the maximum beacon interval at step S408 whenever the beacon frame is received. That is, when the beacon frame is initially received, the new coordinator 210 sets up the beacon interval of the beacon frame as the maximum beacon interval. Subsequently, the new coordinator 210 compares 'a pre-set maximum beacon interval' and 'a post-received beacon interval of the beacon frame' and updates the larger value as the new maximum beacon interval. As described above, the new coordinator 210 uses the maximum beacon interval as the timer for limiting the period of the channel state checking procedure.

The new coordinator 210 determines 'a protection time', which is a time of a slot unit for securing a performance time from the channel state checking procedure to the time offset determining procedure before operation through own operational channel at step S408. The new coordinator 210 compares 'a minimum value of superframe duration of superframe list' with 'a minimum value of own superframe duration' and determines the smaller value as the protection time.

The new coordinator 210 checks at step S409 whether another beacon frame is received by checking a current timer. At this time, when the new coordinator 210 compares the current timer and the maximum beacon interval, the new coordinator 210 compares 'the maximum beacon interval-protection time' excluding the protection time from the maximum beacon interval and the current timer in consideration of the protection time.

That is, when the current timer is within 'the maximum beacon interval-protection time', the new coordinator 210 additionally checks the channel state for each slot, checks at step S410 whether a preamble is received in the start timing of the slot and checks at step S411 whether the received preamble is a beacon frame. At the check result of the steps S410 and S411, the new coordinator 210 receives another beacon frame when there is the preamble in the start timing of the slot and the preamble is the beacon frame.

On the other hand, although the current timer is within 'the maximum beacon interval-protection time', the new coordinator 210 waits for receiving another beacon frame in cases that there is no preamble in the start timing of the slot or that an existing preamble is not the beacon frame. The new coordinator 210 continuously checks a residue time by checking the current timer.

When the current timer is the same as or larger than 'the maximum beacon interval-protection time' at the step S409, the new coordinator 210 determines a reference slot timing at step S412 based on the reference slot showing that the start timing of the superframe duration of the superframe list is '0'.

When the number of the time offset of the '0' value is 1, the new coordinator 210 determines the reference slot timing as a slot timing. When the number of the time offset of the '0' value is 2, the new coordinator 210 determines the reference slot timing as the slot timing of the time offset of the '0' value where other superframe durations consecutively connected to the superframe duration exist more. The new coordinator 210 sets up a new slot counter by excluding the reference slot from the current slot counter.

Figure 6:
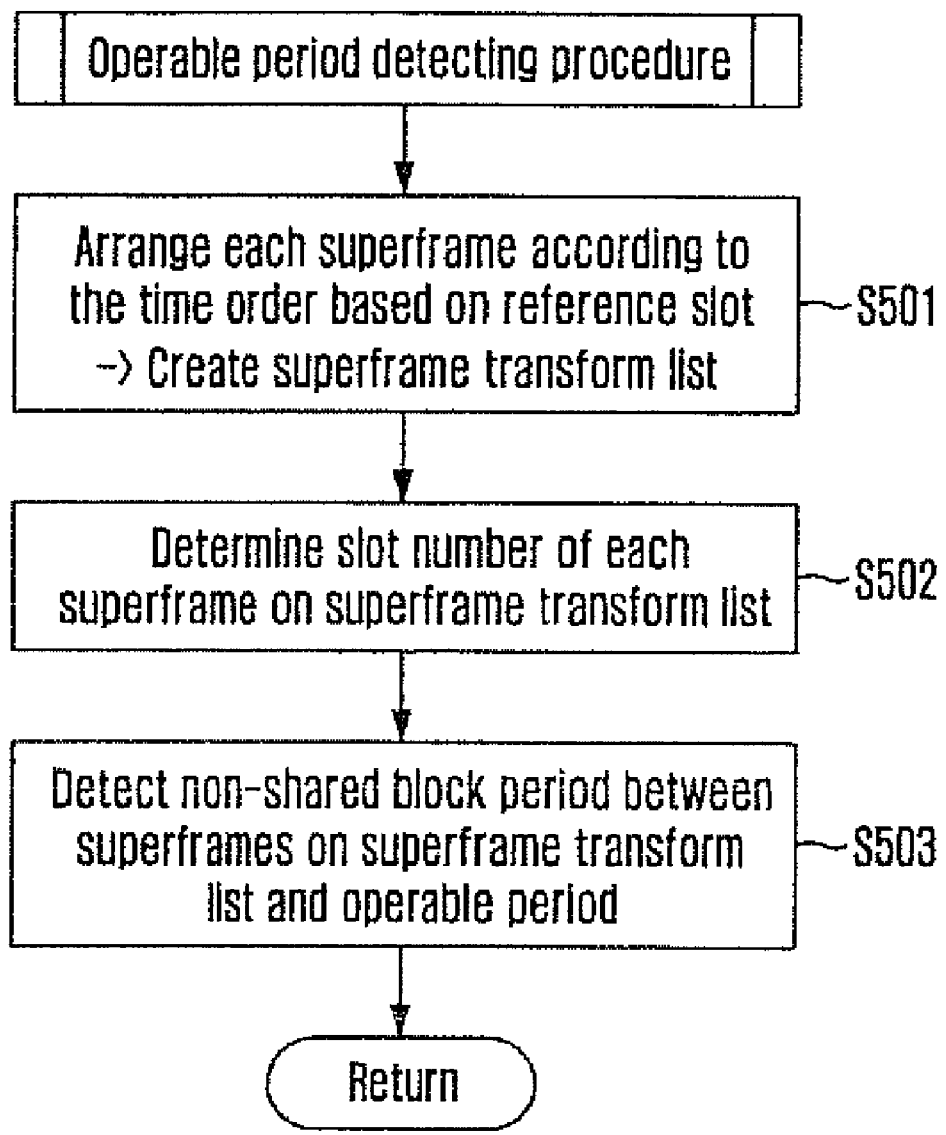
FIG. 6 is a flowchart illustrating an operable period detecting procedure in accordance with an embodiment of the present invention.
Figure 7:
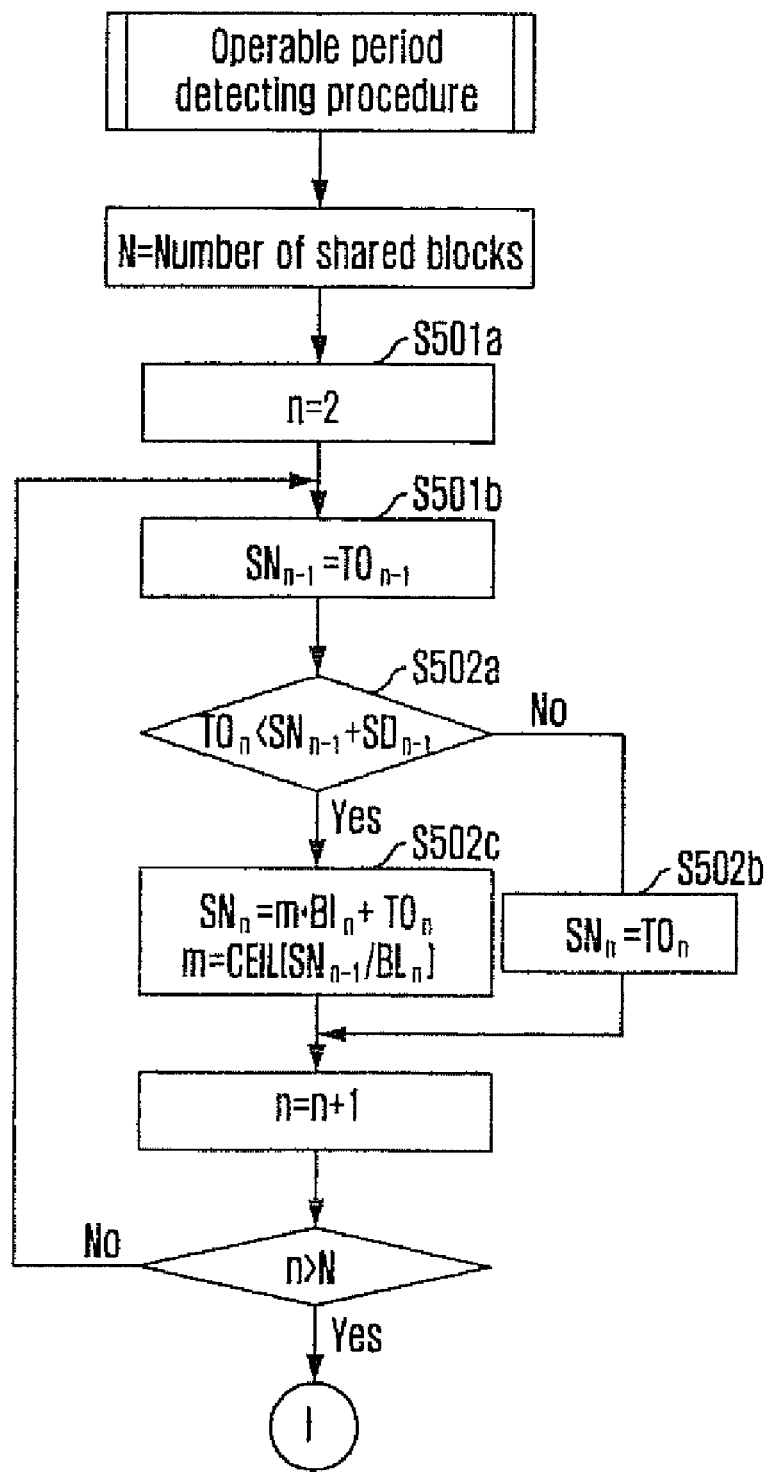
FIGS. 7 and 8 show examples of FIG. 6.

FIG. 6 is a flowchart illustrating the operable period detecting procedure in accordance with an embodiment of the present invention and FIGS. 7 and 8 show examples of FIG. 6.

As shown in FIGS. 6 and 8, the operable period detecting procedure in accordance with the present invention is a procedure that the new coordinator 210 detects whether there is a non-occupied block period for itself in the effective channel.

The new coordinator 210 extensively transforms the time offset of each superframe received through the channel state checking procedure into 'a slot index on the maximum beacon interval' and arranges the superframes in an occupying order. A unified slot number is acquired by extensively transforming the time offset of the superframe according to 'the slot index on the maximum beacon interval'.

That is, the new coordinator 210 arranges each superframe included in the superframe list updated by the channel state checking procedure according to the occupying order from the reference slot to the maximum beacon interval. The reference slot and the maximum beacon interval are checked through the channel state checking procedure.

As described above, the new coordinator 210 newly creates "a superframe transform list", which is a list where the superframes of the superframe list are arranged according to reference slot as the reference. The new coordinator 210 creates the superframe transform list by moving the superframes in front of the reference slot on the superframe list to the end of the superframe list.

For example, when the superframe list is as $SF=[SF_1, SF_2, \ldots, SF_{n-1}, SF_n, \ldots, SF_N]^T$ and there is a reference slot in the $n^{th}$ superframe $SF_n$, the superframe included in the superframe list is transformed as shown in $SF=[SF_n, \ldots, SF_N, SF_1, SF_2, \ldots, SF_{n-1}]^T$. The superframe transform list is as $SF^*=[SF_n, \ldots, SF_N, SF_1, SF_2, \ldots, SF_{n-1}]^T=[SF_1, \ldots, SF_{i-1}, SF_i, SF_i 1, \ldots, SF_N]^T$.

The new coordinator 210 sequentially transforms and updates each superframe time offset in the superframe list into the slot number according to the order of the superframe transform list. An object of the above method is to update 'the slot index on the maximum beacon interval' corresponding to the time offset of the superframe into a slot number while arranging the superframe from the reference slot to the maximum beacon interval according to the time order.

The new coordinator 210 searches 'an operable period', which is a period capable of accepting own superframe duration in 'non-occupied block period' within the superframe duration, which is not occupied by the typical coordinator 220.

To be specific, referring to FIGS. 6 to 8, the new coordinator 210 arranges each superframe in the superframe list according to the time order with the reference slot as a reference and transforms the superframe list into a superframe transform list at step S501. Since the superframe transform list starts from the reference slot, the new coordinator 210 sets up the slot number of the $1^{st}$ superframe on the superframe transform list identically with the time offset of the superframe at steps S501a and S501b.

The new coordinator 210 extensively transforms the time offset of each superframe according to 'the slot index on the maximum beacon interval' with respect to 'each superframe in the superframe transform list', and sequentially determines the slot number at step S502.

In determining 'a slot number $SN_n$ of $n^{th}$ superframe' of the superframe transform list, the new coordinator 210 uses large and small relation of 'a time offset $TO_n$ of the $n^{th}$ superframe' and 'summation of a slot number $SN_{n-1}$ of an n–$1^{th}$ superframe and its superframe duration $SD_{n-1}$, i.e., $SN_{n-1}+SD_{n-1}$' at step S502a.

When $TO_n$ is larger than $SN_{n-1}+SD_{n-1}$, i.e., $TO_n>SN_{n-1}+SD_{n-1}$, at step S502a, the new coordinator 210 determines $SN_n$ as $TO_n$ at step S502b. In the superframe transform list arranging the entire superframes according to the time order, this shows a case that an $n^{th}$ superframe $SF_n$ has a beacon interval, which is the same as or larger than an 'n–$1^{th}$ superframe $SF_{n-1}$', and is continuously located at a regular interval.

When $TO_n$ is smaller than $SN_{n-1}+SD_{n-1}$, i.e., $TO_n \leq SN_{n-1}+SD_{n-1}$, at step S502a, the new coordinator 210 reflects 'a beacon interval $BI_n$ of the $n^{th}$ superframe' on $TO_n$ and determines the $SN_n$ at step S502c. Since the superframe transform list should be arranged according to the time order, this shows a case that $SF_n$ is located in a time prior to $TO_n$. For example, the new coordinator 210 updates the superframe list according to a reception time of the superframe as described above. When the superframe list is as $SF=[SF_1, SF_2, \ldots, SF_{n-1}, SF_n, \ldots, SF_N]^T$, it means that an arrangement order of the superframe list designates the reception time. When the superframe $SF_n$ is the reference slot, it means that the superframe transform list is transformed as $[SF_n, \ldots, SF_N, SF_1, SF_2, \ldots, SF_{N-1}]^T$ and $SF_N$ is located in a time prior to $SF_1$.

Accordingly, in this case, the $SF_n$ should be determined as the $TO_n$ in consideration of $BI_n$. That is, the $SN_n$ is shown as Equation 1.

$$SN_n = m*BI_n + TO_n \qquad \text{Eq. 1}$$

In Equation 1, $m=CEIL(SN_{n-1}/BI_n)$ and a function "CEIL (X)" represent the minimum integer number larger than X. For example, both of CEIL 1.01 and CEIL 1.99 represent 2.

The m means the number of '$n^{th}$ superframe duration $SD_n$' shown from the reference slot as a rate of $SN_{n-1}$ and 'a beacon interval $BI_n$ of the $n^{th}$ superframe'.

As described above, when a slot number and its superframe duration are determined for the entire superframe of the superframe transform list, the new coordinator 210 detects 'a non-occupied block period' showing whether there is a vacant slot between neighboring two superframe durations with respect to each superframe and 'an operable period' showing own operable block period at step S503. In particular, the new coordinator 210 determines the operable period by comparing the non-occupied block period and 'own superframe duration $SD_{me}$'.

In order to check whether there is a non-occupied block period, which is the vacant slot between neighboring two superframe durations, the new coordinator 210 compares $SN_n$ and $OB_k$ (=$SN_{n-1}+SD_{n-1}$) at steps S503a and S503b. When $SN_n$ is smaller than $OB_k$, i.e., $SN_n<OB_k$, at step S503b, the non-occupied block period does not exist between two superframe durations. When $SN_n$ is larger than $OB_k$, i.e., $SN_n>OB_k$, at step S503b, there is the non-occupied block period between two superframe durations. The non-occupied block period is the number of slots corresponding to a difference $\Delta_k$ between $SN_n$ and $OB_k$ at step S503c.

In order to check the operable period, which is the own operable slot block, the new coordinator 210 determines the operable period by comparing the non-occupied block period $\Delta_k$ and 'own superframe duration $SD_{me}$' at step S503d.

To be specific, as the comparison result, when the $\Delta_k$ is the same as or larger than the $SD_{me}$, i.e., $\Delta_k \geq SD_{me}$, there is the operable period at step S503e. At this time, the new coordinator 210 stores the operable period in a table format.

In order to check the operable period through the table, the new coordinator 210 stores 'the non-occupied block period $\Delta_k$' and 'the $OB_k$ capable of checking the start timing of the non-occupied block period' which can be checked since the non-occupied block period $\Delta_k$ is a difference between $SN_n$ and $OB_k$.

As described above, the operable period detecting procedure is performed on the entire superframes of the superframe transform list. That is, when the number of superframes of the superframe transform list, i.e., the number of occupied block periods, is N, the operable period detecting procedure is repeatedly performed as many as N times.

FIG. 9 is a flowchart illustrating the time offset determining procedure in accordance with an embodiment of the present invention. FIG. 10 shows an example of FIG. 9.

As shown in FIGS. 9 and 10, the time offset determining procedure in accordance with the present invention is a procedure of determining a start timing of a slot block properly usable by the new coordinator 210, i.e., a time offset, in the operable period checked through the operable period detecting procedure.

The new coordinator 210 selects a check period for determining a time offset based on a predetermined superframe beacon interval in the superframe transform list.

The new coordinator 210 selects the check period based on 4 beacon intervals including own beacon interval $BI_{me}$, the minimum beacon interval $BI_{min}$, the maximum beacon interval $BI_{max}$, and a reference slot-occupied superframe beacon interval $BI_{ref}$. In particular, it corresponds to the superframe occupying the reference slot, i.e., a beacon interval $BI_1$ of $SF_1$.

The check period is selected according to the size of $BI_{me}$. It is for minimizing an unnecessary calculation quantity and consumption time caused by improper selection of the check period. Accordingly, the new coordinator 210 selects the check period by comparing each of $BI_{min}$, $BI_{max}$, and $BI_{ref}$ with respect to $BI_{me}$.

The new coordinator 210 checks the slot blocks sequentially from the fastest slot number of the check period and determines whether there is a slot block for own superframe duration $SD_{me}$.

Subsequently, the new coordinator 210 determines a time offset through a modular operation for the slot number checked by the determination result.

To be specific, referring to FIGS. 9 and 10, the new coordinator 210 selects a check period for determining a time offset based on the beacon interval of the superframe in the superframe transform list at step S601.

That is, when $BI_{me}$ is smaller than $BI_{min}$ at step S601a, the new coordinator 210 selects $BI_{me}$ as a check period at step S601b.

When $BI_{me}$ is larger than $BI_{max}$ at step S601c, the new coordinator 210 selects $BI_{max}$ as the check period at step S601d.

When $BI_{me}$ is located between $BI_{min}$ and $BI_{max}$, and $BI_{me}$ is larger than $BI_{ref}$ at step S601e, the new coordinator 210 selects $BI_{ref}$ as the check period at step S601f.

When $BI_{me}$ is located between $BI_{min}$ and $BI_{max}$, and $BI_{me}$ is smaller than $BI_{ref}$ at step S601e, the new coordinator 210 selects $BI_{me}$ as the check period at step S601b.

The new coordinator 210 checks at steps S602, S602a, and S602b whether there is a usable slot block in the operable period for own superframe duration $SD_{me}$ in the check period. The new coordinator 210 determines the time offset by checking the operable period in the check period at steps S603, S603a, and S603b.

As described above, when there is no usable slot block in the operable period at steps S602a and S602b, the new coordinator 210 re-performs the procedure of checking whether there is the effective channel at the step S304 of FIG. 4. That is, when the operational channel selecting procedure is performed on each effective channel by checking the entire effective channels, the logic flow goes to the end since there is no usable slot block in the operable period. On the other hand, when the operational channel selecting procedure is performed whenever one effective channel is checked, the operational channel selecting procedure is re-performed after selecting another effective channel.

The procedure of the step S603a will be described in detail.

That is, when there is no slot block for $SD_{me}$ in the operable period, the new coordinator 210 determines that there is no usable slot block in the operable period. When there is one slot block for $SD_{me}$ in the operable period, the new coordinator 210 determines a slot number of the slot block as a time offset timing.

On the other hand, when there is more than one slot block for $SD_{me}$ in the operable period and the maximum slot number of the slot block exceeds $m*BI_{me}$, the new coordinator 210 starts from 'the start timing of the minimum non-occupied block period', i.e., $OB_k$ (k=1) and determines according to whether there is a slot block for each $BI_{me}$ interval.

When there is the slot block, the smallest slot number $OB_k$ (k=1) is determined as a time offset timing.

When there is no slot block, the determine procedure is repeated from '$OB_k$+1' to '$OB_k$+n' according to whether there is the slot block at each $BI_{me}$ interval. The n increases by '$OB_k+\Delta_k-SD_{me}-1$'. It is for checking whether there is the slot block, i.e., the operable period, while changing the slot included within one non-occupied block period.

When there is no slot block, the same procedure is repeated while changing the start timing of the non-occupied block period, i.e., $OB_k$. It is for checking whether there is the slot block, i.e., the operable period, by extending one non-occupied block period into the entire non-occupied block period.

Meanwhile, when $BI_{me}$ is larger than $BI_{ref}$, the new coordinator 210 calculates a time offset according to a modular operation of a slot number $OB_k$+n determined as a time offset timing for $BI_{ref}$, i.e., outputs a rest acquired by dividing $OB_k$+n by $BI_{ref}$ at step S603b. On the other hand, when $BI_{me}$ is smaller than $BI_{ref}$, the new coordinator 210 determines the time offset as the determined slot number $OB_k$+n at the step S603a.

As described above, the time offset is designated as the slot number of $BI_{me}$ or $BI_{ref}$ according to the relative size of $BI_{me}$ and $BI_{ref}$.

Subsequently, the new coordinator 210 creates a beacon frame based on the time offset and starts a superframe at the timing of the time offset.

Figure 11:
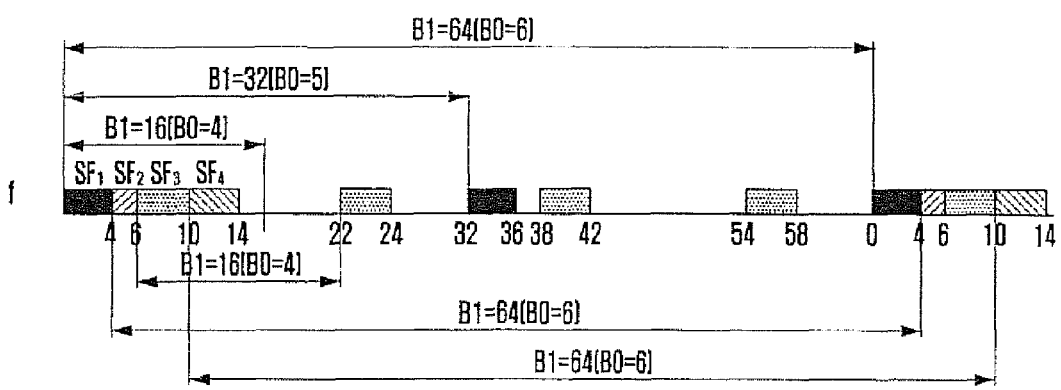
FIG. 11 shows an operational channel selecting state in the wireless narrow area network in accordance with an embodiment of the present invention.

FIG. 11 shows an operational channel selecting state in the wireless narrow area network in accordance with an embodiment of the present invention.

Figure 1:
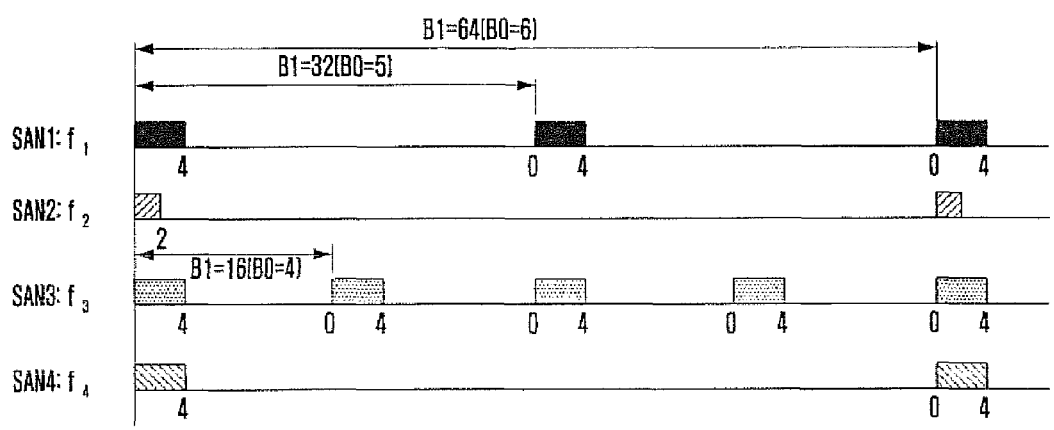
FIG. 1 shows an operational channel selecting state in a plurality of conventional Wireless narrow area networks.

FIG. 11 shows a case that the new coordinator 210 selects one radio channel f as own operational channel. In the operational channel, each superframe is differently occupied by the 4 typical coordinators 220 of FIG. 1. The superframe is displayed as "[a beacon interval, a superframe duration, and a slot number of a time offset]" for convenience.

That is, the coordinator superframe of SAN1 is occupied as $SF_1$=[32,4,0]. The coordinator superframe of SAN2 is occupied as $SF_2$=[64,2,4]. The coordinator superframe of SAN3 is occupied as $SF_3$=[16,4,6]. The coordinator superframe of SAN4 is occupied as $SF_4$=[64,4,10].

As described above, when 4 wireless narrow area networks are built in one radio channel f, 3 radio channels are saved. Accordingly, the present invention can improve operation efficiency of the operational channel as well as frequency efficiency of the radio channel for the wireless narrow area network.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

While the present invention has been described with respect to certain preferred embodiments, it will be apparent to those skilled in the art that various changes and modifications may be made without departing from the scope of the invention as defined in the following claims.

The present invention can be applied to wireless narrow area network such as a body sensor network, a wireless sensor network, and a wireless home network.

What is claimed is:

1. A method for selecting an operational channel of a wireless narrow area network, comprising:
   checking by a first coordinator a channel occupied state of another coordinator operated in an effective channel based on a received beacon frame in the first coordinator of the wireless narrow area network;
   detecting an operable period based on a check result of the channel occupied state of the another coordinator; and
   determining a time offset according to the operable period detection result of the another coordinator,
   wherein the checking by the first coordinator the channel occupied state of the another coordinator includes checking whether different beacon frames are received according to a comparison result of 'a maximum beacon interval excluding a predetermined protection time' and 'a current timer',
   wherein the predetermined protection time is determined as a smallest superframe duration among entire superframe durations including own superframe duration.

2. The method of claim 1, further comprising:
   before said checking the channel occupied state,
   checking whether a predetermined radio channel is pre-occupied; checking whether the pre-occupied radio channel is pre-occupied by a homogeneous coordinator using a same format; and
   selecting the radio channel pre-occupied by the homogeneous coordinator as the effective channel.

3. The method of claim 1, wherein a reference slot timing for determining the time offset of the another coordinator sharing the effective channel based on the beacon frame received through the effective channel, among operational channels is determined.

4. The method of claim 3, wherein the reference slot timing is determined as a slot timing of a time offset '0'.

5. The method of claim 4, wherein local clock and slot synchronization are acquired and superframe information is collected through the beacon frame.

6. The method of claim 1, wherein when a received preamble is the beacon frame in comparison of 'the maximum beacon interval excluding the predetermined protection time' and 'the current timer', it is checked that another beacon frame is received.

7. The method of claim 3, wherein the operable period according to a non-occupied block period between superframes is detected by arranging the superframes according to a time order based on the determined reference slot timing.

8. The method of claim 7, wherein said detecting the operable period, includes:
rearranging each superframe with the determined reference slot timing as a reference according to the time order;
sequentially determining a slot number by extensively transforming the rearranged superframes into 'a slot index on the maximum beacon interval'; and
detecting the operable period for the own superframe duration by determining the non-occupied block period between the superframes.

9. The method of claim 8, wherein the superframes are arranged according to a reference slot by moving the superframes in front of the reference slot to the end of the rearranged superframes.

10. The method of claim 8, wherein the slot number is determined by comparing 'a summation of a slot number of an $(n-1)^{th}$ superframe and a superframe duration of the $(n-1)^{th}$ superframe' and 'a time offset of an $n^{th}$ superframe'.

11. The method of claim 10, wherein when 'the time offset of the $n^{th}$ superframe' is larger than 'the summation of the slot number of the $(n-1)^{th}$ superframe and the superframe duration of the $(n-1)^{th}$ superframe', 'the time offset of the $n^{th}$ superframe' is determined as the slot number.

12. The method of claim 10, wherein when 'the time offset of the $n^{th}$ superframe' is smaller than 'the summation of the slot number of $(n-1)^{th}$ superframe and the superframe duration of the $(n-1)^{th}$ superframe', the slot number is determined in consideration of 'the time offset of the $n^{th}$ superframe' and 'the beacon interval of the $n^{th}$ superframe'.

13. The method of claim 8, wherein the operable period is detected by comparing 'the non-occupied block period existing between neighboring two superframe durations' and 'the own superframe duration'.

14. The method of claim 7, wherein the time offset which is its own superframe start timing, is determined by checking a slot block for the own superframe duration in the detected operable period.

15. The method of claim 14, wherein said determining the time offset includes: selecting a check period of the operable period by comparing own beacon interval with a predetermined beacon interval; and determining the time offset by checking the slot block for the own superframe duration in the selected check period.

16. The method of claim 15, wherein the check period is selected by using a large and small relation among 'own beacon interval', 'a minimum beacon interval', 'the maximum beacon interval' and 'a beacon interval of a superframe occupying a reference slot'.

17. The method of claim 16, wherein the check period is determined as any one of 'the own beacon interval', 'the maximum beacon interval' and 'the beacon interval of the superframe occupying the reference slot' according to the large and small relation among the own beacon interval, 'the minimum beacon interval', 'the maximum beacon interval' and 'the beacon interval of the superframe occupying the reference slot'.

18. The method of claim 15, wherein the time offset is determined according to whether there is the slot block usable as the operable period with respect to entire non-occupied block periods within the check period.

19. The method of claim 15, wherein after a slot number of the time offset timing is determined, the time offset is determined through a modular operation of the slot number and 'the beacon interval of the superframe occupying the reference slot'.

20. A coordinator of a wireless narrow area network for selecting an operational channel, comprising:
a channel state checking means for checking a channel occupied state of another coordinator operated in an effective channel based on a received beacon frame of the wireless narrow area network;
an operable period detecting means for detecting an operable period based on a check result of the channel occupied state in the channel state checking means; and
determining a time offset according to a detection result in the operable period detecting means,
wherein the operable period detecting means detects a non-occupied block period between superframes and the operable period according to the non-occupied block period by arranging the superframes according to a time order based on a reference slot timing determined in the channel state checking means,
wherein the channel state checking means checks whether different beacon frames are received according to a comparison result of 'a maximum beacon interval excluding a predetermined protection time' and 'a current timer',
wherein the predetermined protection time is determined as a smallest superframe duration among entire superframe durations including own superframe duration.

21. The coordinator of claim 20, wherein the channel state checking means determines the time offset of the another coordinator sharing the effective channel based on the beacon frame received through the effective channel, among operational channels.

22. The coordinator of claim 20, wherein the time offset determining means determines the time offset which is its own superframe start timing, by checking a slot block for the own superframe duration in the operable period detected in the operable period detecting means.

23. A non-transitory computer-readable recording media recording a program for realizing following functions in a first coordinator for selecting an operational channel of a wireless narrow area network having a processor, the program which when executed by the processor performs the functions comprising:
checking a channel occupied state of another coordinator operated in an effective channel based on a received beacon frame in the first coordinator of the wireless narrow area network;
detecting an operable period based on a check result of the channel occupied state of the another coordinator; and
determining a time offset according to the operable period detection result of the another coordinator,
wherein the checking by the first coordinator the channel occupied state of the another coordinator includes checking whether different beacon frames are received according to a comparison result of 'a maximum beacon interval excluding a predetermined protection time' and 'a current timer',
wherein the predetermined protection time is determined as a smallest superframe duration among entire superframe durations including own superframe duration.

* * * * *